United States Patent
Yum et al.

(10) Patent No.: US 9,941,948 B2
(45) Date of Patent: Apr. 10, 2018

(54) METHOD OF REPORTING CHANNEL STATE AND APPARATUS THEREFOR

(71) Applicant: LG Electronics Inc., Seoul (KR)

(72) Inventors: Kunil Yum, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/473,911

(22) Filed: Mar. 30, 2017

(65) Prior Publication Data
US 2017/0288757 A1    Oct. 5, 2017

Related U.S. Application Data (60) Provisional application No. 62/316,503, filed on Mar. 31, 2016.

(51) Int. Cl.
| | |
|---|---|
| *H04B 7/06* | (2006.01) |
| *H04W 4/00* | (2009.01) |
| *H04L 1/06* | (2006.01) |
| *H04W 74/08* | (2009.01) |
| *H04L 12/801* | (2013.01) |

(52) U.S. Cl.
CPC ............ *H04B 7/0626* (2013.01); *H04L 47/17* (2013.01); *H04W 74/0833* (2013.01)

(58) Field of Classification Search
CPC ..... H04B 7/0626; H04L 47/17; H04L 1/0693; H04L 1/0044; H04L 1/0053; H04L 5/0012; H04W 74/0833; H04W 52/02; H04W 4/008; H04W 76/1226
See application file for complete search history.

(56) References Cited

U.S. PATENT DOCUMENTS

| | | | |
|---|---|---|---|
| 2012/0208547 A1* | 8/2012 | Geirhofer | H04B 7/0626 455/452.2 |
| 2013/0051322 A1* | 2/2013 | Barbieri | H04W 72/082 370/328 |
| 2015/0049706 A1* | 2/2015 | Lee | H04L 5/0057 370/329 |
| 2015/0289208 A1* | 10/2015 | Liu | H04W 52/0229 370/252 |
| 2016/0007350 A1* | 1/2016 | Xiong | H04W 24/10 370/252 |
| 2016/0127090 A1* | 5/2016 | Takeda | H04L 1/18 370/329 |
| 2016/0135143 A1* | 5/2016 | Won | H04W 72/005 370/312 |
| 2016/0212649 A1* | 7/2016 | Chen | H04W 24/10 |
| 2016/0352482 A1* | 12/2016 | Sun | H04L 5/0048 |
| 2017/0093549 A1* | 3/2017 | Lindbom | H04L 5/0057 |

* cited by examiner

*Primary Examiner* — Andrew Wendell
(74) *Attorney, Agent, or Firm* — Dentons US LLP (57) ABSTRACT

A method of reporting a channel state, which is reported by a terminal configured to transmit and receive data while hopping in a unit of the specific number of resource blocks (RBs) in a wireless communication system, includes receiving a random access response including an aperiodic channel state report request in response to a transmitted random access preamble, calculating channel state information according to the aperiodic channel state report request in consideration of the number of repetitive transmissions for the terminal, and reporting the calculated channel state information to a base station. In this case, the number of repetitive transmissions for the terminal may be determined by a predetermined or signaled value.

20 Claims, 6 Drawing Sheets

METHOD OF REPORTING CHANNEL STATE AND APPARATUS THEREFOR

This application claims the benefit of the U.S. Provisional Application No. 62/316,503, filed on Mar. 31, 2016, which is hereby incorporated by reference as if fully set forth herein.

BACKGROUND OF THE INVENTION

Field of the Invention

The present invention relates to a wireless communication system, and more particularly, to a method of reporting a channel state and an apparatus therefor.

Discussion of the Related Art

A next system of LTE-A considers configuring a UE of low cost/low specification mainly performing data communication such as metering, measuring a water level, utilizing a surveillance camera, inventory reporting of a vending machine and the like. In case of the UE, since a transmission data amount is small and UL/DL data transmission and reception occurs once in a while, it might be efficient to lower UE cost and reduce battery consumption in accordance with a low data transmission rate. Hence, a method of making the UE use maximum 6 RBs only irrespective of a system bandwidth is under consideration. Yet, performance deterioration may occur due to the method. In particular, the UE may operate in poor propagation environment (e.g., basement, warehouse, etc.). In this case, it may use such a method as repetition to increase coverage of the UE. As mentioned above, when a coverage enhancing UE intends to increase a coverage level using such a method as repetition and the like, if the UE changes a band on which the repetition is performed according to time, it may be able to reduce the repetition through a diversity gain, thereby increasing performance and battery consumption time.

SUMMARY OF THE INVENTION

Accordingly, the present invention is directed to an apparatus and method thereof that substantially obviate one or more problems due to limitations and disadvantages of the related art.

An object of the present invention is to provide a method of reporting a channel state.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of reporting a channel state, which is reported by a terminal configured to transmit and receive data while hopping in a unit of the specific number of resource blocks (RBs) in a wireless communication system, includes the steps of receiving a random access response including an aperiodic channel state report request in response to a transmitted random access preamble, calculating channel state information according to the aperiodic channel state report request in consideration of the number of repetitive transmissions for the terminal, and reporting the calculated channel state information to a base station. In this case, the number of repetitive transmissions for the terminal may be determined by a predetermined or signaled value.

Additionally or alternately, the number of repetitive transmissions for the terminal may be determined by the number of repetitive transmissions for an uplink transmission to be transmitted in response to the random access response or a value resulted from multiplying the number of repetitive transmissions for the uplink transmission by a scaling factor.

Additionally or alternately, the number of repetitive transmissions for the terminal may be determined by the number of repetitive transmissions of the random access preamble or a value mapped to the number of repetitive transmissions of the random access preamble.

Additionally or alternately, the number of repetitive transmissions for the terminal may be determined by the maximum value among the number of repetitive transmissions of a downlink data channel and the number of repetitive transmissions of a downlink control channel which are determined according to a coverage enhancement level related to the random access preamble.

Additionally or alternately, the number of repetitive transmissions for the terminal may be determined by the maximum value among candidates of the numbers of repetitive transmissions for calculating channel state information set to the terminal.

Additionally or alternately, the number of repetitive transmissions for the terminal may be determined by the maximum number of repetitive transmissions or the number of repetitive transmissions included in system information received from the base station or a system.

Additionally or alternately, the maximum number of repetitive transmissions or the number of repetitive transmissions included in the system information received from the base station or the system may be set per a coverage enhancement level related to the random access preamble.

Additionally or alternately, the maximum number of repetitive transmissions or the number of repetitive transmissions included in the system information received from the base station or the system may be set to a value irrespective of the coverage enhancement level related to the random access preamble.

Additionally or alternately, the number of repetitive transmissions for the terminal may be determined by the number of repetitive transmissions of the random access response, the maximum number of repetitive transmissions of the random access response, or a value mapped to the number of repetitive transmissions of the random access response or the maximum number of repetitive transmissions of the random access response.

Additionally or alternately, the number of repetitive transmissions for the terminal can be determined by the maximum number of repetitive transmissions, the minimum number of repetitive transmissions, or an average value of the number of repetitive transmissions of a downlink data channel for the terminal.

To achieve these objects and other advantages and in accordance with the purpose of the invention, as embodied and broadly described herein, according to a different embodiment, a terminal configured to report a channel state, transmit and receive data, and hop in a unit of the specific number of resource blocks (RBs) in a wireless communication system includes transmitter and a receiver and a processor configured to control the transmitter and the receiver, the processor configured to receive a random access response including an aperiodic channel state report request in response to a transmitted random access preamble, calculate channel state information according to the aperiodic channel state report request in consideration of the number of repetitive transmissions for the terminal, and report the calculated channel state information to a base station. In this case, the number of repetitive transmissions for the terminal may be determined by a predetermined or signaled value.

Additionally or alternatively, the number of repetitive transmissions for the terminal may be determined by the number of repetitive transmissions for an uplink transmission to be transmitted in response to the random access response or a value resulted from multiplying the number of repetitive transmissions for the uplink transmission by a scaling factor.

Additionally or alternatively, the number of repetitive transmissions for the terminal may be determined by the number of repetitive transmissions of the random access preamble or a value mapped to the number of repetitive transmissions of the random access preamble.

Additionally or alternatively, the number of repetitive transmissions for the terminal may be determined by the maximum value among the number of repetitive transmissions of a downlink data channel and the number of repetitive transmissions of a downlink control channel which are determined according to a coverage enhancement level related to the random access preamble.

Additionally or alternatively, the number of repetitive transmissions for the terminal may be determined by the maximum value among candidates of the numbers of repetitive transmissions for calculating channel state information set to the terminal.

Additionally or alternatively, the number of repetitive transmissions for the terminal may be determined by the maximum number of repetitive transmissions or the number of repetitive transmissions included in system information received from the base station or a system.

Additionally or alternatively, the maximum number of repetitive transmissions or the number of repetitive transmissions included in the system information received from the base station or the system may be set per a coverage enhancement level related to the random access preamble.

Additionally or alternatively, the maximum number of repetitive transmissions or the number of repetitive transmissions included in the system information received from the base station or the system may be set to a value irrespective of the coverage enhancement level related to the random access preamble.

Additionally or alternatively, the number of repetitive transmissions for the terminal may be determined by the number of repetitive transmissions of the random access response, the maximum number of repetitive transmissions of the random access response, or a value mapped to the number of repetitive transmissions of the random access response or the maximum number of repetitive transmissions of the random access response.

Additionally or alternatively, the number of repetitive transmissions for the terminal may be determined by the maximum number of repetitive transmissions, the minimum number of repetitive transmissions, or an average value of the number of repetitive transmissions of a downlink data channel for the terminal.

It is to be understood that both the foregoing general description and the following detailed description of the present invention are exemplary and explanatory and are intended to provide further explanation of the invention as claimed.

According to one embodiment of the present invention, it is able to perform aperiodic channel state reporting triggered in a random access procedure.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/ downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Figure 1:
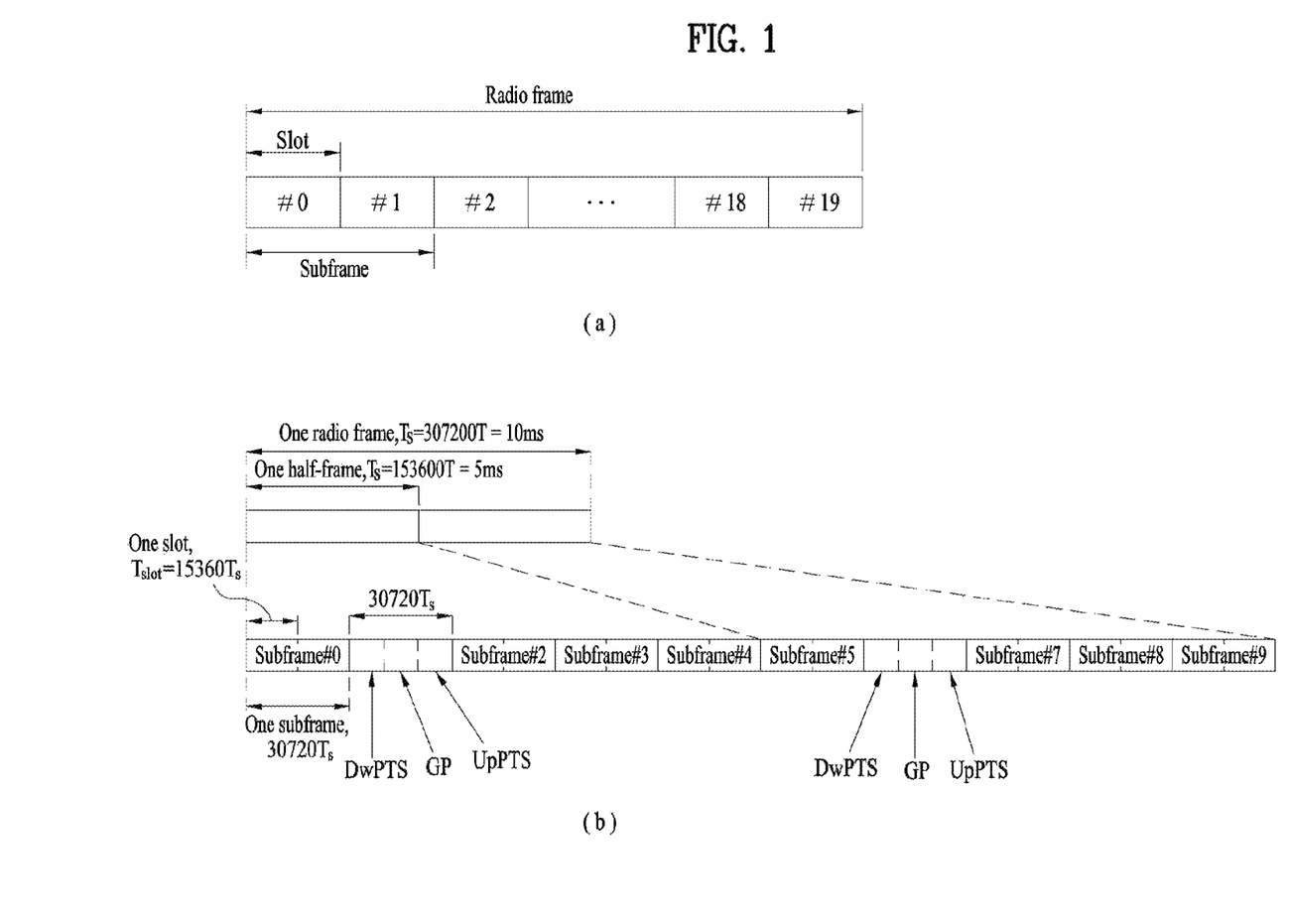
FIG. 1 is a diagram for an example of a radio frame structure used in a wireless communication system.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
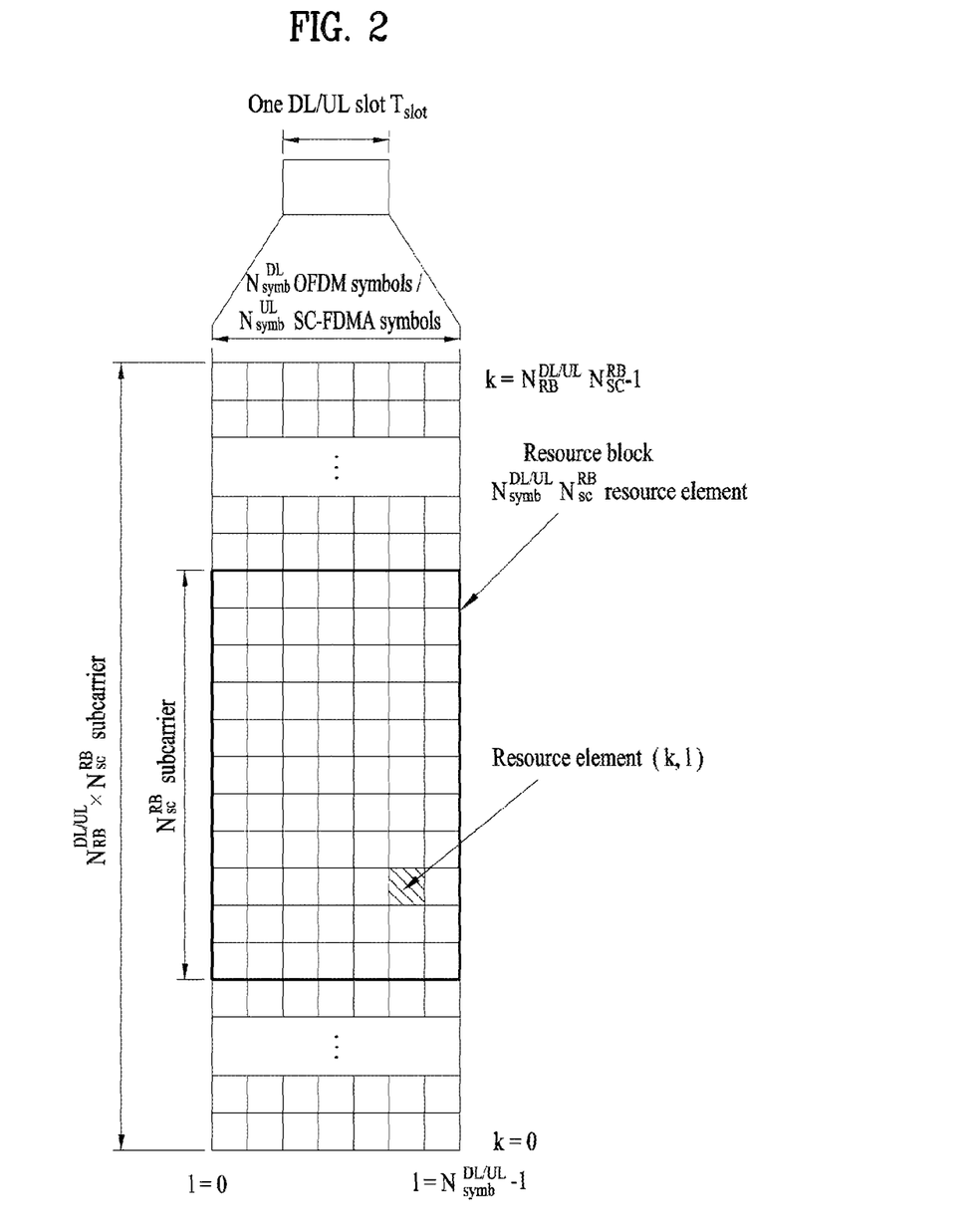
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{RB}^{DL/UL}*N_{sc}^{RB}$ REs. Each RE in a resource grid can be uniquely defined by an index pair (k, 1) in a slot. Here, k is an index in the range of 0 to $N_{RB}^{DL/UL}*N_{sc}^{RB}-1$ in the frequency domain and 1 is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
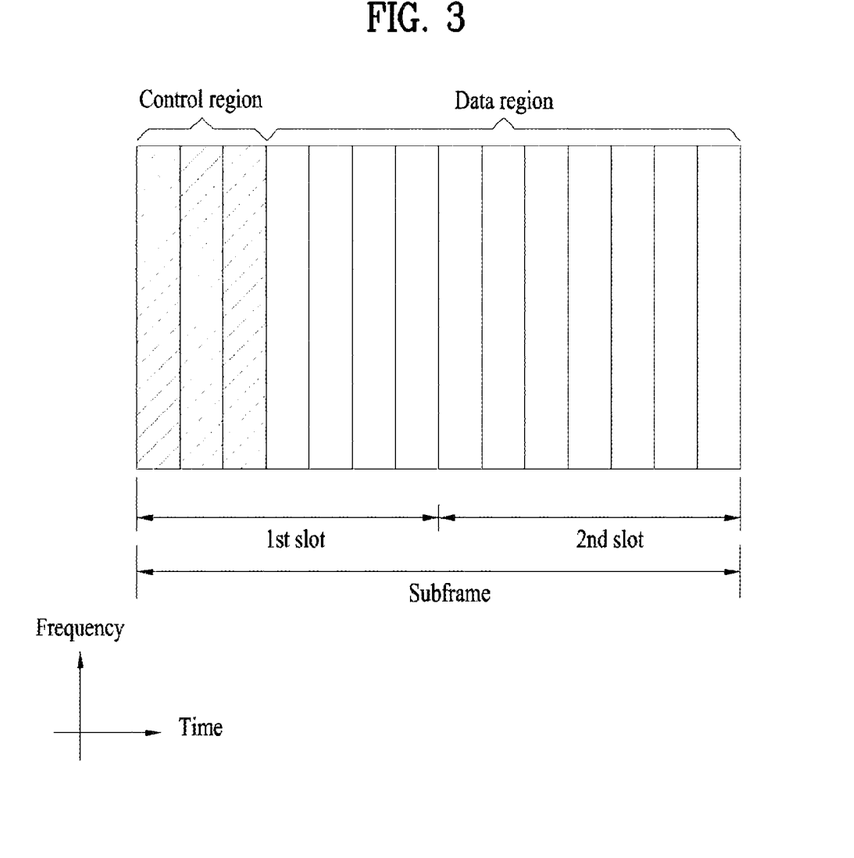
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

Search Space

| Type | Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
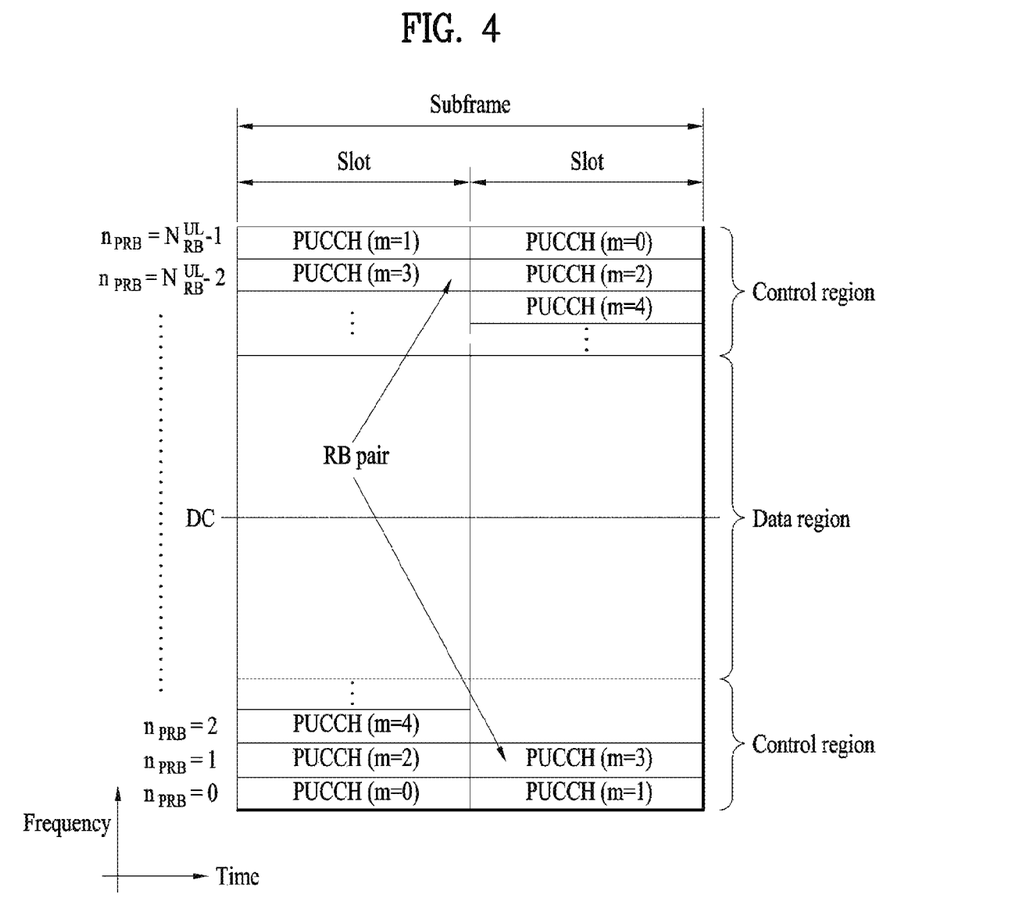
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 7

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 7, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein,

TABLE 8

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2<br>RI<br>1st wideband CQI(4 bit)<br>2nd wideband CQI(4 bit)<br>if RI > 1<br>N*Subband PMI(4 bit)<br>(N is the total # of subbands)<br>(if 8Tx Ant, N*subband W2 + wideband W1) |
| | UE selected (Subband CQI) | Mode 2-0<br>RI (only for Open-loop SM)<br>1st wideband CQI(4 bit) + Best-M CQI(2 bit)<br>(Best-M CQI: An average CQI for M SBs selected from among N SBs)<br>Best-M index (L bit) | | Mode 2-2<br>RI<br>1st wideband CQI(4 bit) + Best-M CQI(2 bit)<br>2nd wideband CQI(4 bit) + Best-M CQI(2 bit) if RI > 1<br>Best-M index (L bit)<br>Wideband PMI(4 bit) + Best-M PMI(4 bit)<br>(if 8Tx Ant, wideband W2 + Best-M W2 + wideband W1) |
| | Higher Layer-configured (Subband CQI) | Mode 3-0<br>RI (only for Open-loop SM)<br>1st wideband CQI(4 bit) + N*subbandCQI(2 bit) | Mode 3-1<br>RI<br>1st wideband CQI(4 bit) + N*subbandCQI(2 bit)<br>2nd wideband CQI(4 bit) + N*subbandCQI(2 bit)<br>if RI > 1<br>Wideband PMI(4 bit)<br>(if 8Tx Ant, wideband W2 + wideband W1) | Mode 3-2<br>RI<br>1st wideband CQI(4 bit) + N*subbandCQI(2 bit)<br>2nd wideband CQI(4 bit) + N*subbandCQI(2 bit)<br>if RI > 1<br>N*Subband PMI(4 bit)<br>(N is the total # of subbands)<br>(if 8Tx Ant, N*subband W2 + wideband W1) |

The transmission modes in Table 8 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI transmission over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 9

| | | PMI feedback type | |
|---|---|---|---|
| | | No PMI | Single PMI |
| PUCCH CQI feedback type | Wideband (wideband CQI) UE selective (subband CQI) | Mode 1-0 Mode 2-0 | Mode 1-1 Mode 2-1 |

A UE may be set in transmission modes as shown in FIG. 9. Referring to FIG. 9, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

A next system of LTE-A considers configuring a UE of low cost/low specification mainly performing data communication such as metering, measuring a water level, utilizing a surveillance camera, inventory reporting of a vending machine and the like. In case of the UE, since a transmission data amount is small and UL/DL data transmission and reception occurs once in a while, it might be efficient to lower UE cost and reduce battery consumption in accordance with a low data transmission rate. Hence, a method of making the UE use maximum 6 RBs only irrespective of a system bandwidth is under consideration. Yet, performance deterioration may occur due to the method. In particular, the UE may operate in poor propagation environment (e.g., basement, warehouse, etc.). In this case, it may use such a method as repetition to increase coverage of the UE. As mentioned above, when a coverage enhancing UE intends to increase a coverage level using such a method as repetition and the like, if the UE changes a band on which the repetition is performed according to time, it may be able to reduce the repetition through a diversity gain, thereby increasing performance and battery consumption time. In particular, the UE can perform subband hopping to obtain the diversity gain. When the UE supports the subband hopping, it is preferable to perform the subband hopping in consideration of CSI measurement and feedback. Meanwhile, "subband" of the "subband hopping" corresponds to a concept different from a concept of "subband" related to CSI report of legacy LTE standard.

For a small cell coverage enhancing UE, it may use CSI feedback. In particular, if channel information is reported via aperiodic CSI, it may be able to perform better transmission by receiving more CSI.

Figure 5:
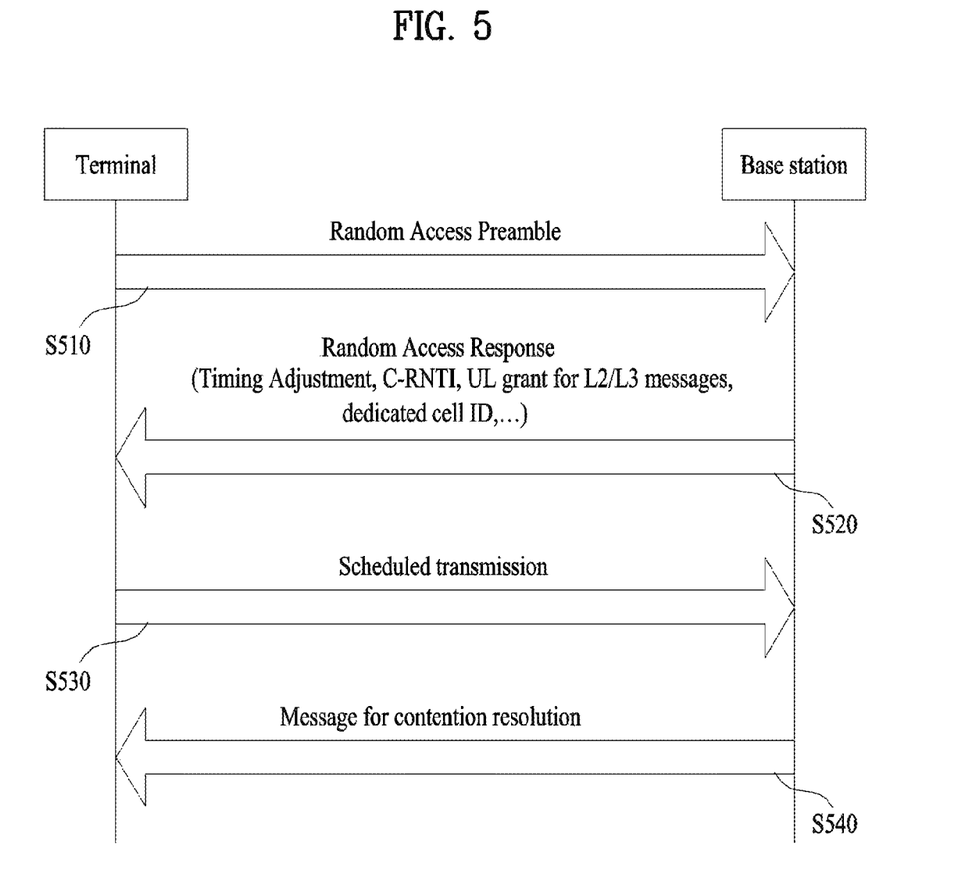
FIG. 5 is a flowchart for a random access procedure used in 3GPP LTE/LTE-A system.

In case of an RACH (random access channel), it may be able to trigger aperiodic CSI reporting via 1-bit trigger of a UL grant included in a RAR (random access response). FIG. 5 illustrates a contention-based random access procedure. In case of a non-contention-based random access procedure, first two steps among the steps shown in FIG. 5 are used only. A random access procedure related to the present invention is briefly explained in the following.

A UE can transmit a random access preamble to a base station [S510]. Having received the random access preamble, the base station can transmit a random access response (RAR) to the UE [S520]. The RAR can include a UL grant DCI that makes the UE grant UL transmission. Subsequently, the UE transmits an UL signal (e.g., msg3) to the base station using an identifier for a UE included in the RAR [S530] and the base station transmits a DL signal to the UE over a series of processes {S540} to inform the UE that contention of the random access procedure is solved.

As mentioned in the foregoing description, in order to achieve a specific purpose and effect according to the specific purpose, repetition or repetitive transmission is introduced to a UE to enhance coverage. To this end, a base station sets M subframe (M>1) reference resource to be used for calculating CSI to the UE (i.e., to make the UE calculate the CSI under an assumption of M number of repetitive transmissions). The UE calculates/reports the CSI under the assumption that data is transmitted over M number of subframes. In this case, when an aperiodic CSI is requested via an RAR, the aperiodic CSI can be requested before an M value is configured via higher layer. In this case, the M value can be configured as follows. Meanwhile, the aperiodic CSI reporting can be referred to as aperiodic CSI reporting via PRACH in the present specification.

As one embodiment of the present invention, a UE may receive a configuration of the number of repetitive transmissions to be used for PUSCH in which the msg3 is transmitted from the base station. The number of repetitive transmissions can be used as the M value for the aperiodic CSI. Or, the M value can be determined by a value resulted from multiplying the number of repetitive transmissions of PUSCH by a prescribed scaling factor or mapping.

As a different embodiment of the present invention, the UE may use the number of repetitive transmissions of PRACH (e.g., a most recently used value) as the M value or M value mapped to the number of repetitive transmissions of PRACH.

A mode for enhancing coverage is mainly divided into two modes including a CE (coverage enhancement) mode A and a CE mode B. The CE mode A corresponds to a mode using the relatively small number of repetitive transmissions (e.g., 1 to 32) and uses coverage such as a UE category 1. The CE mode B corresponds to a mode using the relatively large number of repetitive transmissions (e.g., 1 to 2048). The CE mode can be configured according to a CE level of PRACH. In particular, in case of a PRACH CE level 0 or 1, the CE mode A is configured. In case of a PRACH CE level 2 or 3, the CE mode B can be configured. Or, the CE mode can be configured by a base station via RRC signaling.

In case of the PRACH CE level 0 or 1, a UE uses a maximum value (e.g., 32) among PDSCH repetitive transmission level and (M)PDCCH repetitive transmission level of the CE mode A. In case of the PRACH CE level 2 or 3, the UE may use a maximum value (e.g., 2048) among PDSCH repetitive transmission level and (M)PDCCH repetitive transmission level of the CE mode B. More generally, the UE can use a value mapped to the number of repetitive transmissions of PRACH as the M value. In this case, the MPDCCH corresponds to a physical downlink control channel used for an MTC (machine type communication) UE. A UE requiring the aforementioned coverage enhancement is referred to as the MTC UE.

As a further different embodiment of the present invention, a UE may use the maximum number of repetitive transmissions, which is used for a CSI reference resource capable of being set to the UE, as the M value. The maximum number (R_CSIMax) of repetitive transmissions for the CSI reference resource can be determined by one of {1, 2, 4, 8, 16, 32, and reserved}. Hence, the maximum number of repetitive transmissions for aperiodic CSI (reporting) on PRACH can be defined and used by 32. The set of the R_CSIMax values can be determined by the PRACH CE level.

As a further different embodiment of the present invention, a UE may use the maximum number of transmissions of PDSCH received or configured via an SIB (system information block) as the M value.

As a further different embodiment of the present invention, a UE may receive the number of repetitive transmissions for CSI (M value) via an SIB transmitted on PBCH. The M value can be configured according to a PRACH CE level or may correspond to a cell common value to the CE mode A. Or, the M value may correspond to a value applied to all UEs irrespective of a CE mode.

As a further different embodiment of the present invention, a UE may use an M value determined by the number of repetitive transmissions of DCI of RAR or the maximum number of repetitive transmissions. The M value is identical to the number of repetitive transmissions of DCI of RAR or the maximum number of repetitive transmissions. Or, the M value may correspond to a value mapped to the number of repetitive transmissions of DCI of RAR or the maximum number of repetitive transmissions. If the M value is determined by the number of repetitive transmissions of DCI of RAR or the maximum number of repetitive transmissions, since the M value uses the number of repetitive transmissions of DCI transmitted in DL, it is matched with the purpose of calculating DL CSI. Since the M value uses the number of repetitive transmissions used for DL transmission, it may be able to expect relatively accurate CSI.

As a further different embodiment of the present invention, a UE may use a predetermined or fixed M value. More specifically, the M value may correspond to the maximum number of repetitive transmissions of PDSCH, the minimum number of repetitive transmissions of PDSCH, or an average value of the number of repetitive transmissions of PDSCH in the CE mode A.

Since the aforementioned embodiments do not use RRC configuration in determining the M value, it may be helpful in a contention-based random access where the RRC configuration is unavailable. On the contrary, since embodiments described in the following use the RRC configuration or an M value used for practically transmitting DL/UL data, the embodiments in the following can be used for a random access in an RRC-connected mode, i.e., a non-contention-based random access.

As a further different embodiment of the present invention, a UE may use an M value configured by a base station via RRC. This is because, since a RACH capable of performing aperiodic CSI request corresponds to a non-contention-based RACH, there exists a higher layer configuration used for the base station to trigger an aperiodic CSI request via DCI to the UE and the UE is able to use the higher layer configuration as it is. Although the higher layer configuration does not have additional signaling overhead, the configuration is unable to reflect a changed channel state as it is. As a result, it may use a wrong M value.

As a further different embodiment of the present invention, if PDSCH is previously transmitted, a UE may use the number of repetitive transmissions of the PDSCH (a recently used value) or an M value mapped to the number of repetitive transmissions of the PDSCH. In this case, if the PDSCH corresponds to the CE mode A, the UE uses the maximum value among a PDSCH repetition level and an (M)PDCCH repetition level of the CE mode A. If the PDSCH corresponds to the CE mode B, the UE may use the maximum value among a PDSCH repetition level and an (M)PDCCH repetition level of the CE mode B. Or, the UE may use a maximum value (or a minimum value or an average value) among the number of repetitive transmissions of PDSCH/PUSCH or an M value mapped to the maximum value instead of the number of repetitive transmissions of PDSCH.

Figure 6:
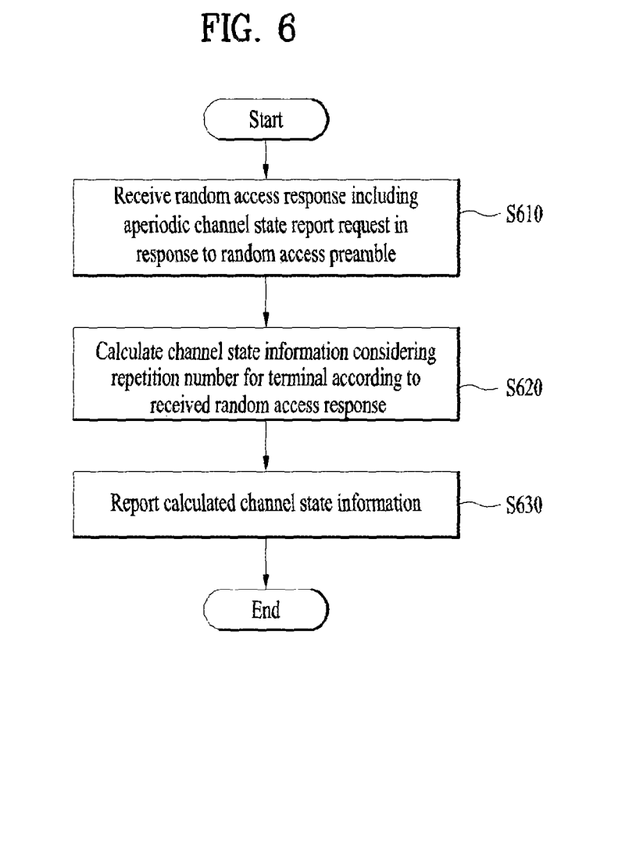
FIG. 6 is a flowchart for operations according to one embodiment of the present invention.

FIG. 6 is a flowchart for operations according to one embodiment of the present invention. FIG. 6 illustrates a method of reporting a channel state in a wireless communication system. A UE performs hopping in a unit of the specific number of resource blocks (RBs) to repetitively transmit and receive data.

The UE can receive a random access response including an aperiodic channel state report request in response to a transmitted random access preamble [S610]. The UE can calculate channel state information according to the aperiodic channel state report request in consideration of the number of repetitive transmissions for the UE [S620]. Subsequently, the UE can report the calculated channel state information to a base station [S630]. In this case, the number of repetitive transmissions for the UE can be determined by a predetermined or signaled value.

Additionally or alternately, the number of repetitive transmissions for the UE can be determined by the number of repetitive transmissions for UL transmission to be transmitted in response to the random access response or a value resulted from multiplying the number of repetitive transmissions for UL transmission by a scaling factor.

Additionally or alternately, the number of repetitive transmissions for the UE can be determined by the number of repetitive transmissions of the random access preamble or a value mapped to the number of repetitive transmissions of the random access preamble.

Additionally or alternately, the number of repetitive transmissions for the UE can be determined by a maximum value of the repetitive transmissions of a DL data channel or a DL control channel which is determined according to a coverage enhancement level related to the random access preamble.

Additionally or alternately, the number of repetitive transmissions for the UE can be determined by a maximum value among the number of repetitive transmissions candidates for calculating channel state information set to the UE.

Additionally or alternately, the number of repetitive transmissions for the UE can be determined by the maximum number of repetitive transmissions or the number of repetitive transmissions included in system information received from the base station or a system. The maximum number of repetitive transmissions or the number of repetitive transmissions included in the system information received from the base station or the system can be configured according to a coverage enhancement level related to the random access preamble. Or, the maximum number of repetitive transmissions or the number of repetitive transmissions included in the system information received from the base station or the system can be configured by a value irrespective of the coverage enhancement level related to the random access preamble.

Additionally or alternately, the number of repetitive transmissions for the UE can be determined by the number of repetitive transmissions or the maximum number of repetitive transmissions of the random access response or a value mapped to the number of repetitive transmissions or the maximum number of repetitive transmissions.

Additionally or alternately, the number of repetitive transmissions for the UE can be determined by the maximum number of repetitive transmissions, the minimum number of repetitive transmissions, or an average value of the number of repetitive transmissions of a DL data channel for the UE.

Figure 7:
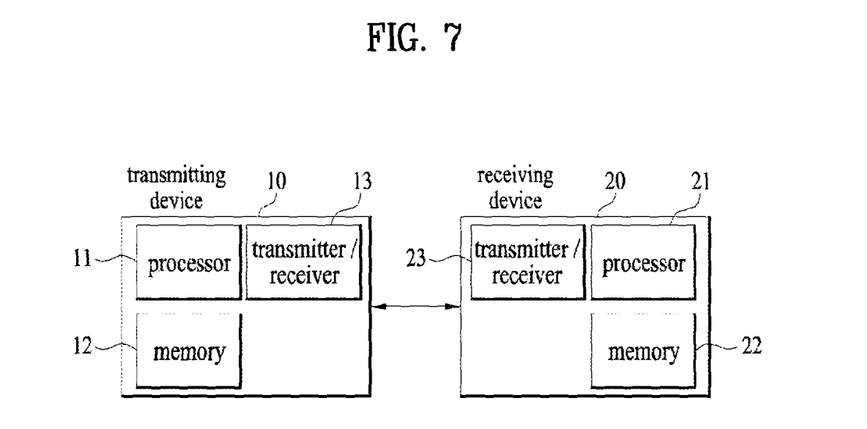
FIG. 7 is a block diagram for a device for implementing embodiment(s) of the present invention.

FIG. 7 is a block diagram illustrating a transmitter 10 and a receiver 20 configured to implement embodiments of the present invention. Each of the transmitting device 10 and receiving device 20 includes a transmitter and a receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter and the receiver 13, 23 and the memory 12, 22 to control the memory 12, 22 and/or the transmitter and the receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitting device 10 performs predetermined coding and modulation of a signal and/or data scheduled by the processor 11 or a scheduler connected to the processor 11, and then transmits a signal and/or data to the transmitter and the receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the transmitter and the receiver 13 may include an oscillator. The transmitter and the receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter and the receiver 23 of the receiving device 20 receives a radio signal transmitted from the transmitting device 10 under control of the processor 21. The transmitter and the receiver 23 may include Nr receive antennas, and retrieves baseband signals by frequency down-converting the signals received through the receive antennas. The transmitter and the receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter and the receiver 13, 23 includes one or more antennas. According to an embodiment of the present invention, the antennas function to transmit signals processed by the transmitter and the receiver 13, 23 are to receive radio signals and deliver the same to the transmitter and the receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. A transmitter and a receiver supporting the Multiple-Input Multiple-Output (MIMO) for transmitting and receiving data using a plurality of antennas may be connected to two or more antennas.

In embodiments of the present invention, the UE operates as the transmitting device 10 on uplink, and operates as the receiving device 20 on downlink. In embodiments of the present invention, the eNB operates as the receiving device 20 on uplink, and operates as the transmitting device 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

What is claimed is:

1. A method of reporting a channel state, which is reported by a terminal configured to transmit and receive data while hopping in a unit of the specific number of resource blocks (RBs) in a wireless communication system, comprising:
   receiving a random access response including an aperiodic channel state report request in response to a transmitted random access preamble;
   calculating channel state information according to the aperiodic channel state report request in consideration of the number of repetitive transmissions for the terminal; and
   reporting the calculated channel state information to a base station,
   wherein the number of repetitive transmissions for the terminal is determined by a predetermined or signaled value.

2. The method of claim 1, wherein the number of repetitive transmissions for the terminal is determined by the number of repetitive transmissions for an uplink transmission to be transmitted in response to the random access response or a value resulted from multiplying the number of repetitive transmissions for the uplink transmission by a scaling factor.

3. The method of claim 1, wherein the number of repetitive transmissions for the terminal is determined by the number of repetitive transmissions of the random access preamble or a value mapped to the number of repetitive transmissions of the random access preamble.

4. The method of claim 1, wherein the number of repetitive transmissions for the terminal is determined by the maximum value among the number of repetitive transmissions of a downlink data channel and the number of repetitive transmissions of a downlink control channel which are determined according to a coverage enhancement level related to the random access preamble.

5. The method of claim 1, wherein the number of repetitive transmissions for the terminal is determined by the maximum value among candidates of the numbers of repetitive transmissions for calculating channel state information set to the terminal.

6. The method of claim 1, wherein the number of repetitive transmissions for the terminal is determined by the maximum number of repetitive transmissions or the number of repetitive transmissions included in system information received from the base station or a system.

7. The method of claim 6, wherein the maximum number of repetitive transmissions or the number of repetitive transmissions included in the system information received from the base station or the system is set per a coverage enhancement level related to the random access preamble.

8. The method of claim 6, wherein the maximum number of repetitive transmissions or the number of repetitive transmissions included in the system information received from the base station or the system is set to by a value irrespective of the coverage enhancement level related to the random access preamble.

9. The method of claim 1, wherein the number of repetitive transmissions for the terminal is determined by the number of repetitive transmissions of the random access response or the maximum number of repetitive transmissions of the random access response, or a value mapped to the number of repetitive transmissions of the random access response or the maximum number of repetitive transmissions of the random access response.

10. The method of claim 1, wherein the number of repetitive transmissions for the terminal is determined by the maximum number of repetitive transmissions, the minimum number of repetitive transmissions, or an average value of the number of repetitive transmissions of a downlink data channel for the terminal.

11. A terminal configured to report a channel state, transmit and receive data, and hop in a unit of the specific number of resource blocks (RBs) in a wireless communication system, comprising:
    a transmitter and a receiver; and
    a processor configured to control the transmitter and the receiver, the processor configured to receive a random access response including an aperiodic channel state report request in response to a transmitted random access preamble, calculate channel state information according to the aperiodic channel state report request in consideration of the number of repetitive transmissions for the terminal, and report the calculated channel state information to a base station,
    wherein the number of repetitive transmissions for the terminal is determined by a predetermined or signaled value.

12. The terminal of claim 11, wherein the number of repetitive transmissions for the terminal is determined by the number of repetitive transmissions for an uplink transmission to be transmitted in response to the random access response or a value resulted from multiplying the number of repetitive transmissions for the uplink transmission by a scaling factor.

13. The terminal of claim 11, wherein the number of repetitive transmissions for the terminal is determined by the number of repetitive transmissions of the random access preamble or a value mapped to the number of repetitive transmissions of the random access preamble.

14. The terminal of claim 11, wherein the number of repetitive transmissions for the terminal is determined by the maximum value among the number of repetitive transmissions of a downlink data channel and the number of repetitive transmissions of a downlink control channel which are determined according to a coverage enhancement level related to the random access preamble.

15. The terminal of claim 11, wherein the number of repetitive transmissions for the terminal is determined by the maximum value among candidates of the numbers of repetitive transmissions for calculating channel state information set to the terminal.

16. The terminal of claim 11, wherein the number of repetitive transmissions for the terminal is determined by the maximum number of repetitive transmissions or the number of repetitive transmissions included in system information received from the base station or a system.

17. The terminal of claim 16, wherein the maximum number of repetitive transmissions or the number of repetitive transmissions included in the system information received from the base station or the system is set per a coverage enhancement level related to the random access preamble.

18. The terminal of claim 16, wherein the maximum number of repetitive transmissions or the number of repetitive transmissions included in the system information received from the base station or the system is set to a value irrespective of the coverage enhancement level related to the random access preamble.

19. The terminal of claim 11, wherein the number of repetitive transmissions for the terminal is determined by the number of repetitive transmissions of the random access response or the maximum number of repetitive transmissions of the random access response, or a value mapped to the number of repetitive transmissions of the random access response or the maximum number of repetitive transmissions of the random access response.

20. The terminal of claim 11, wherein the number of repetitive transmissions for the terminal is determined by the maximum number of repetitive transmissions, the minimum number of repetitive transmissions, or an average value of the number of repetitive transmissions of a downlink data channel for the terminal.

* * * * *